Oct. 22, 1935.  S. SCHNELL  2,018,325
LIQUID PRESSURE MECHANISM
Filed July 9, 1932
Fig.1.
Fig.2.
Fig.3.
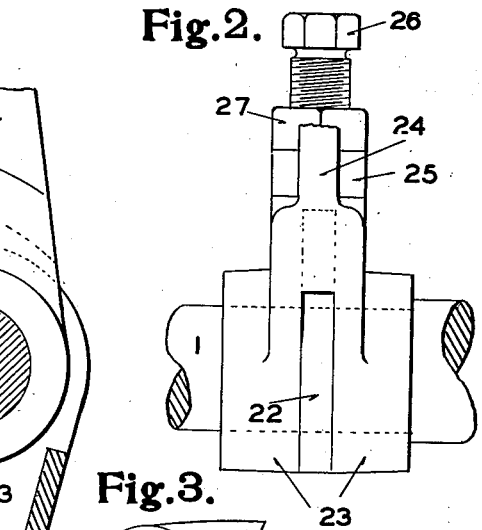
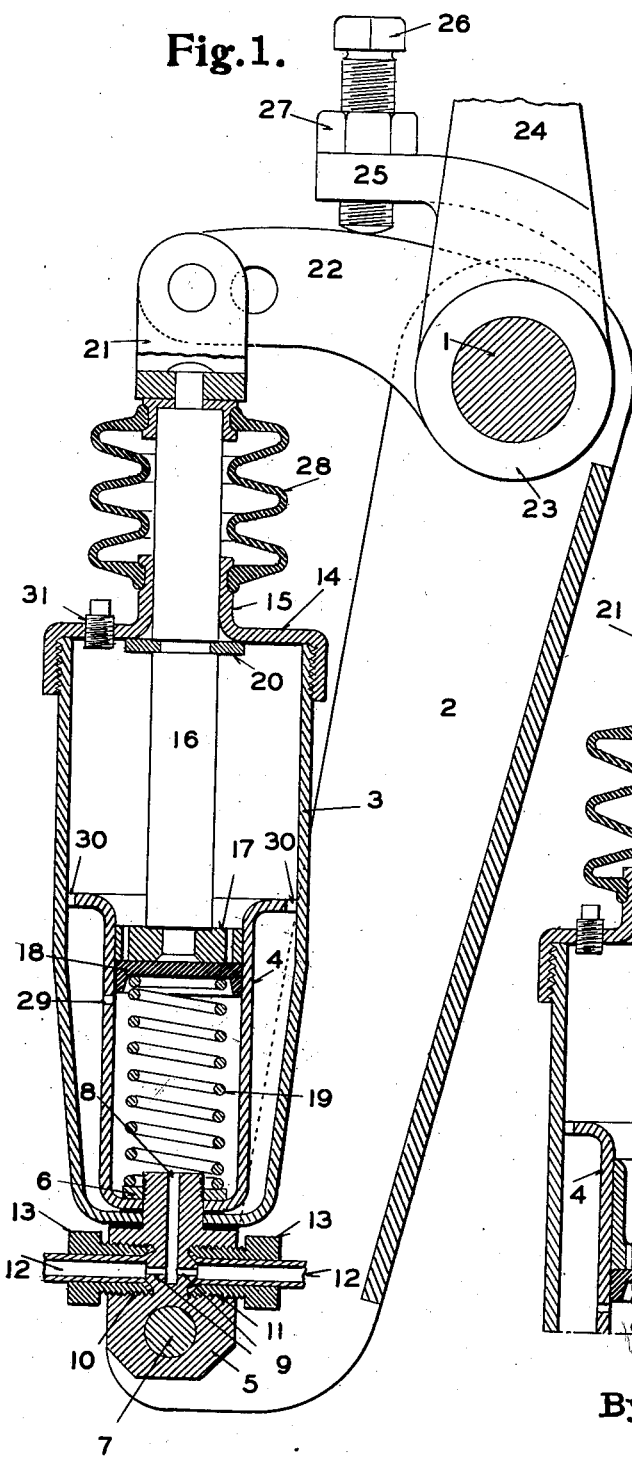
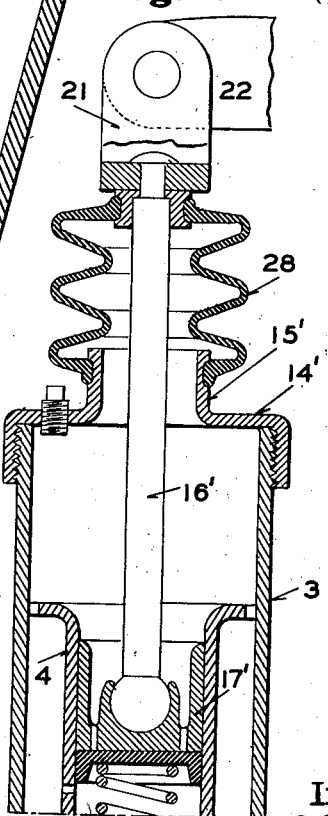
Inventor
S. SCHNELL
By ⟨signature⟩
Att'y.

Patented Oct. 22, 1935

2,018,325

UNITED STATES PATENT OFFICE 2,018,325

LIQUID PRESSURE MECHANISM

Steve Schnell, St. Louis, Mo., assignor to Wagner Electric Corporation, St. Louis, Mo., a corporation of Delaware Application July 9, 1932, Serial No. 621,591

11 Claims. (Cl. 60—54.6)

My invention relates to fluid pressure mechanism and more particularly to improvements in compensating master cylinders for hydraulically actuated brakes. Compensating cylinders now in commercial use have their cylinders in a horizontal position, the reciprocable piston therein being actuated either by an arm on a cross shaft positioned in a reservoir embracing the cylinder end, or by a piston rod extending to the rear of the piston, as for example disclosed in Loughead Patent No. 1,764,179. The latter type of master cylinder is the most economical to manufacture but has the disadvantage of a possible loss of fluid at the rear of the piston due to wear of the secondary packing cup. This disadvantage is not present in the other type of master cylinder but its cost of manufacture is much higher.

One of the objects of my invention is to produce a master cylinder of the compensating type which will have no possibility of leakage and yet be very economical to manufacture.

Another object of my invention is to produce a generally upright combined master cylinder device including a fluid reservoir which embraces the rear of the piston and is formed by a casing which also contains the master cylinder, the piston being actuated by a rod extending through the top of the reservoir.

Other objects will become apparent from the following description of two embodiments of my invention taken in connection with the accompanying drawing in which Figure 1 is a cross-sectional view of my improved combined master cylinder and reservoir device mounted upon a motor vehicle; Figure 2 is a rear view of the brake pedal and actuating lever; and Figure 3 is a cross-sectional view of a modified form of master cylinder.

Referring to the drawing, 1 indicates a non-rotatable rod fixedly mounted on the chassis of a motor vehicle and has secured to it a strut or support 2 extending downwardly to a point below and slightly forward of the shaft 1. A cup-shaped casing member 3 contains a cup-shaped cylinder member 4 in the lower portion, the rear of the cylinder having bearing on the walls of the casing by means of the flange, as shown. The bottoms of the cylinder 4 and of the cup-shaped casing 3 are secured together by means of a fitting member 5 passing through openings in the bottoms of the cylinder and the casing. Suitable sealing washers are interposed between the fitting member, the casing, and the cylinder, the entire assembly being held together by means of a nut 6 on the inner end of the fitting member. The cylinder and the casing are pivoted to the lower end of the strut 2 by means of a pivot pin 7 extending through a portion of the fitting member 5. This fitting member is provided with a central passage 8 connecting the interior of the cylinder with a cross passage 9 which extends into a pair of threaded recesses 10 and 11. These recesses are adapted to receive the conduits 12 leading to the forward and rear brakes of the vehicle, the conduits being held in fluid-tight connection with the cross passage 9 by means of the nuts 13.

The casing 3 is provided at its upper end with a cover member 14 in which is formed a central guide 15. A piston rod 16 is slidable in the guide 15 and has mounted upon its inner end a piston 17 adapted to reciprocate in the cylinder 4. The piston is provided with the usual packing cup 18 and is held in retracted position by means of a spring 19, the retracted position of the piston being determined by means of a stop 20 secured to the piston rod and cooperating with the inner edges of the guide 15. The upper end of the piston rod carries a clevis 21 for connecting the rod to an actuating arm 22. The arm 22 is pivoted to the cross shaft 1 and lies between the bearings 23 of the pivotally mounted brake pedal 24, also on the shaft 1. The pedal 24 carries a short arm 25 overlying the arm 22 and has an adjusting screw 26 cooperating with the lever 22, the adjusting screw 26 being held in the desired position by means of a nut 27.

In order to prevent dust and dirt from entering the interior of the casing 3 through the guide 15, the piston rod is surrounded by a dust boot 28, one end of which embraces the guide 15 and the other end of which embraces the piston rod adjacent the clevis 21. The cylinder 4 is provided with a compensating port 29 at a point just ahead of the piston cup 18 when the piston is in its retracted position, this port permitting interchange of fluid between the cylinder and the reservoir formed by casing 3 when the piston is retracted. The space surrounding the cylinder is connected with the upper portion of the casing 3 by suitable openings 30 in the flange of the cylinder. The cover 14 has a plugged opening 31 for filling the casing 3 with a suitable operating fluid.

In operation of my improved master cylinder, the casing 3 is filled with a desired fluid, as is the cylinder 4, the conduits 12, and other parts of the braking system (not shown). When it is desired to apply the brakes, the brake pedal is depressed, thereby forcing the piston 17 downwardly from its retracted position, as shown, cutting off compensating port 29 and forcing fluid out of the cylinder through passages 8 and 9 and the conduits 12, thereby applying the brakes.

Since the end of the arm 22, which is connected to the piston rod 16, travels in a circular path as it is actuated, the casing and the cylinder will rock about its pivotal connection with the strut 2. This pivotal mounting of the casing 3 insures no binding of the piston and the piston rod. The distance between guide 15 and the piston is such as to prevent any side thrust during actuation of the piston. When the pedal 24 is released, the spring 19 and the pressure exerted on the fluid by the brake releasing springs (not shown), will return the piston to its retracted position as determined by the stop 20.

The arm 22 is shown as provided with an additional clevis pin receiving hole whereby the leverage of arm 22 may be changed if desired. By suitable adjustment of the adjusting screw 26, the angular relation between the arm 22 and the pedal 24 can be properly varied to provide for the necessary pedal travel between the released position of the pedal and the floor boards of the vehicle.

The strut 2 between the fixed rod 1 and pivot 7 of the fluid motor is only under tension and it can be easily designed to be sufficiently strong to prevent any variation in distance between these two points when a high pressure is placed on the pedal.

It is also to be noted that in my improved construction the reservoir for the cylinder is at all times above and embraces the open end of the cylinder and the rear of the piston, thereby preventing all possibility of air being drawn into the system, and all possibility of any leakage of liquid, there being no joint between relatively moving parts which is required to be liquid tight. The entire structure can be very economically manufactured as the cylinder and the casing may, for example, both be of drawn steel.

Another important feature of my invention is that different size cylinders may be used with the casing 3 without changing the dimensions of the casing due to the spacing of the cylinder from the walls of the casing. Thus it is seen that the cylinder and the piston are the only members that need be changed to adapt the master cylinder to different size vehicles. The changing of the cylinder and piston is a very simple matter as the cover 14 and the piston and piston rod 16 only need be removed to secure access to the nut 6.

In Figure 3, I have shown my improved master cylinder designed for use where it is desired to have the casing 3 stationary instead of pivoted. In this construction the cover 14' is provided with an enlarged opening for receiving the piston rod 16' which, instead of being directly connected to the piston, as in Figure 1, is connected by means of a ball and socket joint as shown. The piston 17' is provided with a rearwardly extending circumferential flange for cooperation with the walls of the cylinder in order to more effectively guide the piston within the cylinder walls. The boot 28 embraces a circumferential flange 15' surrounding the opening through the cover 14'. The operation of this structure is the same as the one previously described except that the circular path of the end of the arm 22 when actuated causes pivotal movement of the piston rod alone instead of pivotal movement of the entire master cylinder.

Having fully described my invention, what I claim as new and desire to secure by Letters Patent of the United States is:

1. In a fluid pressure mechanism, a casing having its axis substantially vertical and a generally upright cylinder positioned in the lower portion of said casing and opening into the upper portion thereof, said cylinder being of somewhat smaller diameter than the casing and said open end of the cylinder being provided with a flange engaging the walls of the casing to position said end of the cylinder therein, and means for removably securing the bottom of the casing and cylinder together whereby cylinders of varying diameter may be positioned in the casing.

2. In a fluid pressure mechanism, a vertically positioned casing, a vertical cylinder in the casing and provided with a flange at its upper end spacing it from the walls of the casing, said casing forming a fluid reservoir located above the upper end of the cylinder, and a piston reciprocable in the cylinder, said flange being provided with means for establishing communication between the reservoir and the space between the cylinder and the walls of the casing and said cylinder being in communication with said space when the piston is in its retracted position.

3. In fluid pressure mechanism, the combination of a support, a reservoir casing, a cup-shaped cylinder therein, a conduit fitting pivoted to the support and provided with a hollow extension extending through the bottom walls of the casing and cylinder, removable means within the cylinder and cooperating with the extension for securing the casing and cylinder to the extension, and a piston reciprocable in the cylinder.

4. In fluid pressure mechanism, the combination with a support, of a generally upright cup-shaped reservoir casing, a cup-shaped cylinder in the lower part of the reservoir, removable means extending through the bottom walls of the cylinder and reservoir for securing them together, said removable means being provided with a passage therethrough, means for pivoting said removable means to the support, and a piston reciprocable in said cylinder.

5. In fluid pressure mechanism, the combination with a support, of a generally upright cup-shaped reservoir casing, a cup-shaped cylinder in the lower part of the reservoir, removable means extending through the bottom walls of the cylinder and reservoir for securing them together, said removable means being provided with a passage therethrough, means for pivoting said removable means to the support, a piston reciprocable in said cylinder, and means for establishing communication between said cylinder and said reservoir when the piston is in its retracted position.

6. A master cylinder device comprising a generally upright cup-shaped casing forming a fluid reservoir, an upright cup-shaped cylinder member positioned in the lower portion of said casing, the top portion of said cylinder being provided with a flange engaging the inner wall of the casing, a member extending through the bottom walls of the casing and the cylinder and provided with means for removably clamping the bottom of the cylinder to the bottom of the casing, said member being provided with an outlet passage, and a piston reciprocable in said cylinder.

7. In a master cylinder device, a pair of upright nested cup-shaped members, the inner member being provided with a perforated flange engaging the wall of the outer member for spacing said members apart, means for removably securing the bottom walls of the members together, a piston reciprocable in the inner cup-shaped member, and means establishing communication between the outer and inner members at a point in advance of the piston when the piston is in retracted position.

8. A master cylinder device comprising a support, a generally upright cup-shaped casing, an upright cup-shaped cylinder positioned in the lower portion of said casing, the top portion of said cylinder being provided with a flange engaging the inner wall of the casing, a member extending through the bottom walls of the casing and the cylinder and provided with means for removably clamping the bottom of the cylinder to the bottom of the casing, said member having an outlet passage therethrough, means for pivoting the member to the support, a piston reciprocable in said cylinder, and a lever pivoted to the support for actuating the piston.

9. In a master cylinder device, a support, a pair of upright nested cup-shaped members, the inner cup-shaped member being provided with a flange engaging the wall of the outer cup-shaped member for spacing the said members apart, a member extending through the bottom walls of said cup-shaped members for securing them together, said member being pivoted to the support and provided with an outlet passage, a piston reciprocable in the inner cup-shaped member, means establishing communication between the inner and outer cup-shaped members at a point in advance of the piston when the piston is in retracted position, an arm pivoted to the support and connected to the piston, and means for operating said arm.

10. In hydraulic brake mechanism, the combination of a generally upright rigid cup-shaped casing, a generally upright liquid pressure cylinder positioned in the lower part of said casing, a piston in said cylinder, a piston actuating element reciprocable through the upper end of the casing, and means at the upper end of said cylinder and engaging the wall of the casing to prevent relative lateral movement between said upper end of the cylinder and the casing, said casing extending a substantial distance above the upper end of the cylinder and forming a fluid containing reservoir for maintaining fluid in contact with the rear of the piston in all of the positions of the piston.

11. In a fluid pressure mechanism, a generally upright rigid casing, a cylinder positioned in the lower part of said casing, means at the upper end of said cylinder spacing said upper end from the walls of said casing, said means also preventing relative lateral movement between the upper end of the cylinder and the casing, said casing forming a fluid reservoir located above the upper end of the cylinder and said spacing means permitting communication between the reservoir and the space between the cylinder and the walls of the casing, a piston reciprocable in the cylinder and provided with a piston rod extending upwardly and beyond the upper end of the casing and reciprocable through said upper end, and means establishing communication between the space surrounding the cylinder and the interior of the cylinder when the piston is in its retracted position.

STEVE SCHNELL.